March 13, 1962 H. O. RUSSELL 3,024,969
COMPRESSOR REAR FRAME
Filed Dec. 26, 1957 2 Sheets-Sheet 1
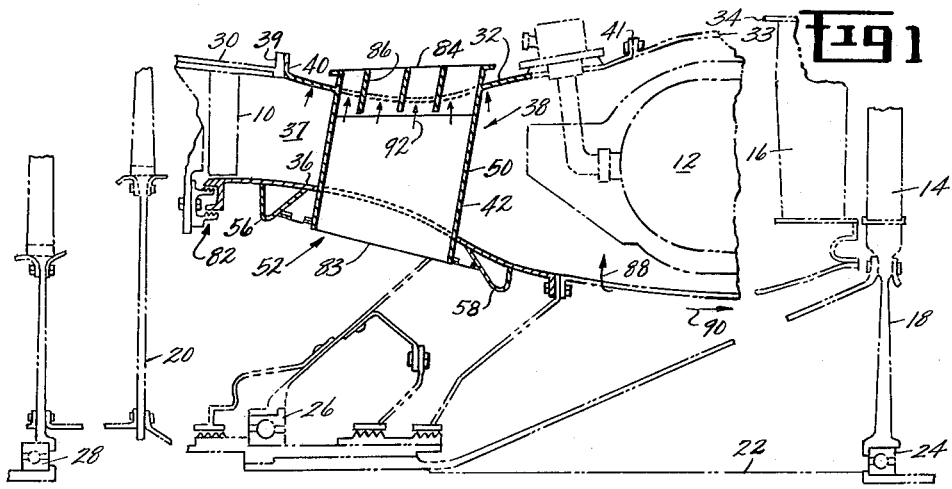
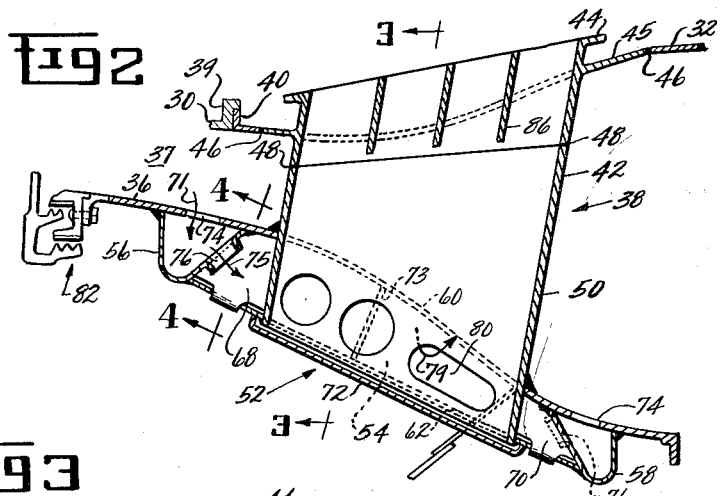
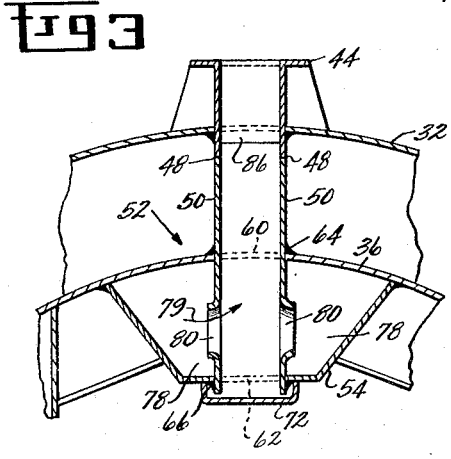
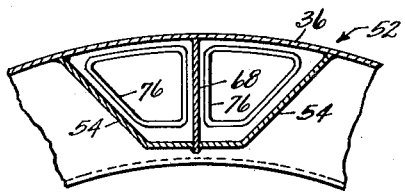
INVENTOR.
HENRY O. RUSSELL
BY
Maurice H. Klitzman
ATTORNEY—

March 13, 1962 H. O. RUSSELL 3,024,969
COMPRESSOR REAR FRAME

Filed Dec. 26, 1957 2 Sheets-Sheet 2

INVENTOR.
HENRY O. RUSSELL
BY

United States Patent Office 3,024,969
Patented Mar. 13, 1962

3,024,969
COMPRESSOR REAR FRAME
Henry Odell Russell, Cincinnati, Ohio, assignor to General Electric Company, a corporation of New York
Filed Dec. 26, 1957, Ser. No. 705,265
5 Claims. (Cl. 230—133)

This invention relates to the construction of the compressor rear frame of an aircraft gas turbine engine and more particularly to the manner in which structural loads are transmitted within the compressor rear frame.

Generally, in a gas turbine engine, motive fluid is taken on board the engine through a compressor and compressed, after which it passes into a combustion section where the motive fluid is mixed with fuel and ignited so as to supply energy to the motive fluid. This combustion process of the motive fluid results in high temperature gases which then pass through a turbine where sufficient energy is taken out of the gases to drive the compressor. The remaining hot gases are then expanded through an exhaust nozzle and passed out to the atmosphere to produce thrust. The turbine which takes out sufficient energy from the hot gases to drive the compressor is directly connected to a compressor rotor which rotates with the turbine rotor as a fixed unit. It is not only necessary that the rotor be rotatably mounted but that it be maintained concentric with the other stationary components of the engine. In order to maintain the concentricity, the rotor is generally supported in three bearings commonly referred to as the aft bearing at the turbine, mid bearing at the rear of the compressor, and forward bearing at the forward end of the compressor. It can be readily seen that due to the high speeds of the rotor, the rotor must be supported so as to maintain a clearance yet not rub against the other components of the engine. Clearance of the rotor with respect to the other stationary components of the engine must be maintained at a very small minimum. Due to build up of manufacturing tolerances, differential thermal expansion of the parts, and dynamic unbalance of the parts, this clearance is difficult to maintain. This invention is concerned more particularly with how the mid bearing is supported and how the loads and differential thermal expansions are transmitted, although the invention might have uses with respect to the other bearings of the engine.

The invention is further concerned with the diffuser passage located about the mid bearing and between the compressor section and combustor section. The diffuser passageway is annular and is designed to convert kinetic energy in the air into pressure energy prior to its entry into the combustor section. The diffuser passageway is formed by the outer rear frame compressor casing and an annular inner diffuser cone connected by a plurality of struts. The invention is more particularly directed to the manner in which the struts are connected to the outer casing and inner diffuser cone.

In some prior engines, the stationary turbine section is connected to the stationary compressor section by a heavy cylindrical longitudinally extending structural member positioned radially inward of the combustors. In these prior engines the combustors are either a plurality of cylinders, called cans, equally placed about the structural member or coaxially spaced cylinders forming an annulus between them. The outer casing of these combustors is not made of structural material. However, in view of the need for light weight material to increase the thrust to weight ratio, the more modern engines have eliminated the heavy structural member and use the outer casing of the combustor as the structural member. In these more modern engines, the mid bearings are then supported entirely by struts extending down from the outer rear frame compressor casing. Therefore, all of loads required to be transmitted, must be transmitted from the rotor through bearings and struts to the outer casing without any assistance from heavy structural members used previously in older engines.

As noted above, this invention deals with the compressor rear frame, in that area where the motive fluid is generally diffused so as to slow it down for entrance into the combustion system. As a result of the air being compressed, the temperature of the motive fluid in the diffuser area in modern engines ranges from 600° F. to 1200° F. and may even go higher with newer types of engines. This is relatively high temperature ambient air in which load transmitting members operate. Many loads are required to be transmitted from the rotor to the bearing and then through to the outer casing in addition to loads due to gases. These are basically radial and axial loads on the bearing. The axial loads on the bearing primarily arise from aerodynamic loading or axial forces on the rotor system. The radial loads arise primarily from aircraft maneuvering and rotor unbalance which create vibrations. Another load to which the struts may be subjected is a torsional or twisting load transmitted to the inner ends of the struts by the inner diffuser cone which in turn is connected to the inner combustion casing and the radially inner end of the first stage nozzle diaphragm. The first stage nozzle diaphragm normally takes energy out of the gases by expanding them and in doing so produces a tendency for the nozzle diaphragm to rotate. In addition to the torsional load, the nozzle diaphragm imposes an axial load on the inner combustion casing which in transmitted to the inner diffuser cone. Pressure differentials across the inner diffuser cone produce additional axial and radial loads that must be resisted by the frame structure. And lastly, internal pressure loads tending to burst the container (hoop stress) on the outer casing must also be resisted.

In prior engines these loads have been transmitted from the bearing to the inner diffuser cone and then to the outer casing by a plurality of struts in the gas passage which have been welded to the inner cone and the outer casing. In those prior engines having a lightweight outer casing, the radially outer portions of the struts are secured to the outer casing adjacent the flange on the rear compressor frame. This flange is generally a heavy structural member adapted to provide rigidity to the outer casing in all directions. Not only do the loads listed above have to be absorbed by the flange but also differential thermal expansion of the inner diffuser cone and strut with respect to the main compressor flange and outer casing. In prior engines the practice has been to secure the struts at both the radially outer and inner ends to structure having radial rigidity, such as flanges and other heavy structure. This type of construction results in high internal thermal stresses which must be resisted. If these portions of the engine are constructed of extremely heavy structural material, then they can withstand the stresses placed upon them. However, this is contrary to the concept of constructing a light weight, high thrust engine, one of the main objectives in designing an aircraft gas turbine engine. If on the other hand, any of the parts are of relatively light weight sheet metal, large stress concentrations can result in cracking and ultimate destruction of the parts. An example would be the inner diffuser cone constructed of light weight thin material and made stiff against radial deflection by providing manifold rings around the inner circumference and the strut and outer flange constructed so as to be rigid in a radial direction, all considered necessary to maintain concentricity; and transmit the loads. This makes a rigid connection at both ends of the strut with no means for compensating for differential thermal expansion. The vibratory forces created by the various loadings described above and the differential thermal expansion will create large stress concentrations in the lightweight diffuser inner cone material, resulting in cracks. Also, the struts are secured to the rigid outer flange and diffuser inner cone by fillet welds. A fillet weld is one which bonds two parts together which are at right angles to one another. Since the weld is nested between parts that are at right angles to each other, any movement of these parts will result in stress concentrations and the tendency to place the weld in bending. Since fillet welds are weakest when under bending, as opposed to tension or shear, cracking of the weld or the material adjacent to its results when subject to the bending loads.

It should be pointed out that even though the outer casing, at the joint of the struts with the casing, is quite flexible in the radial direction, the casing is extremely stiff in the axial and the circumferential directions. Considering a load acting transversely of the diffuser passageway on the inner cone or inner structure, the load will not be transmitted to the outer casing primarily by the radial struts due to the flexibility of the outer casing to radial forces, but the transverse load will be transmitted to the casing by struts essentially perpendicular to the direction of the load. Hence, the load is transmitted to the outer skin in a direction in which the outer skin is extremely stiff. This maintains the rotor concentric with the outer casing but yet permits growth radially due to differential thermal expansion.

Another problem associated with the compressor rear frame is the function of disposing of leakage air from the last stage seal of this compressor. Since the compressor rotor rotates with respect to the compressor stator, a rotating clearance is required so that leakage occurs even though it is held to a minimum by using seals between the stationary and rotating portions. The seals are designed to provide a large pressure drop to the leakage air so as to make the air substantially useless and restrict the flow. Also, this air exerts a forward load on the last disc of the compressor and, if excessive, the unit pressure would create an unbalanced forward force on the rotor. Therefore, this seal leakage air is expelled through the struts to the atmosphere. Also, the prior engines bleed air from the diffuser passageway into the struts and then to the airframe cabin for pressurization purposes. However, the prior constructions have been limited in the amount of air that could be bled since the number of struts had to be kept to a minimum so as not to create too large of a blockage area in the diffuser passageway, and in addition, the cross sectional area of each of these struts were required to be kept to a minimum. Accordingly, the prior constructions placed a limitation on the number of struts that could be used and therefore the amount of air that could be bled from the compressor.

It is therefore an object of this invention to utilize the outer skin or casing of an aircraft gas turbine engine as the load carrying member and to support the rotatable members from bearings, the support being sufficiently rigid to carry the loads transmitted from the rotor and bearing to the outer casing, the support including structural members fixed to the outer skin and inner diffuser cone in such a manner so as to transmit the loads without creating excessive stress concentrations and to eliminate cracking.

It is another object of this invention to provide a means for supporting an inner diffuser cone and struts from a thin lightweight outer casing of a gas turbine engine, in which the inner portion of the struts and inner cone are rigidly connected so that they move in unison as a single body and the struts being secured in the outer casing and sufficiently distant from flanges on the outer casing to permit the struts, inner cone and outer casing to move in a radially inwardly and outwardly direction as a result of differential thermal expansion between the inner cone and strut with relation to the outer casing, and as a result of torsional loads on the inner diffuser cone and strut with respect to the outer casing.

It is another object of this invention to provide a means for connecting a strut to a thin lightweight outer casing of an aircraft gas turbine engine and eliminating high stress concentration areas in the outer casing by spreading the stress concentrations, caused by differential thermal expansions, over a wider area by connecting the strut to the casing at a point remote from any other flange on the casing so not to incur the influence of the rigidity of the flange in a radial direction.

It is another object of this invention to provide a plurality of struts for supporting an inner diffuser cone of an aircraft gas turbine from the outer casing, the struts being constructed in such a manner as to bleed larger amounts of air from the aft end of the compressor than heretofore possible by prior methods with a smaller number of struts.

Briefly stated, and in accordance with one aspect of this invention, I provide a gas turbine engine in which the outer skin is flexible in a radial direction and is used to receive the loads from the inner diffuser cone by the use of struts, whereby the struts are rigidly fixed to the inner cone by a box shaped construction and connected to the outer skin in a manner to permit the outer skin to be rigid with respect to loads in the plane of the material, yet sufficiently flexible to permit radial deflection of the outer casing when there is differential thermal expansion or other loads of the inner diffuser cone and strut with respect to the outer casing.

These and other objects will become more apparent when read in the light of the accompanying specification and drawing, wherein the parts are referred to specifically but are intended to be applied as generically as the prior art will permit, and wherein like parts have like numbers and wherein:

FIGURE 1 is a cross sectional view partially in broken sections showing how the turbine, compressor, and combustion sections are mounted relative to each other.

FIGURE 2 is an enlarged cross sectional view of a diffuser section located between the compressor and the combustion sections.

FIGURE 3 is a cross sectional view taken on lines 3—3 of FIGURE 2 and showing the details of the strut in accordance with this invention.

FIGURE 4 is a cross sectional view taken on lines 4—4 of FIGURE 2.

Figure 5:
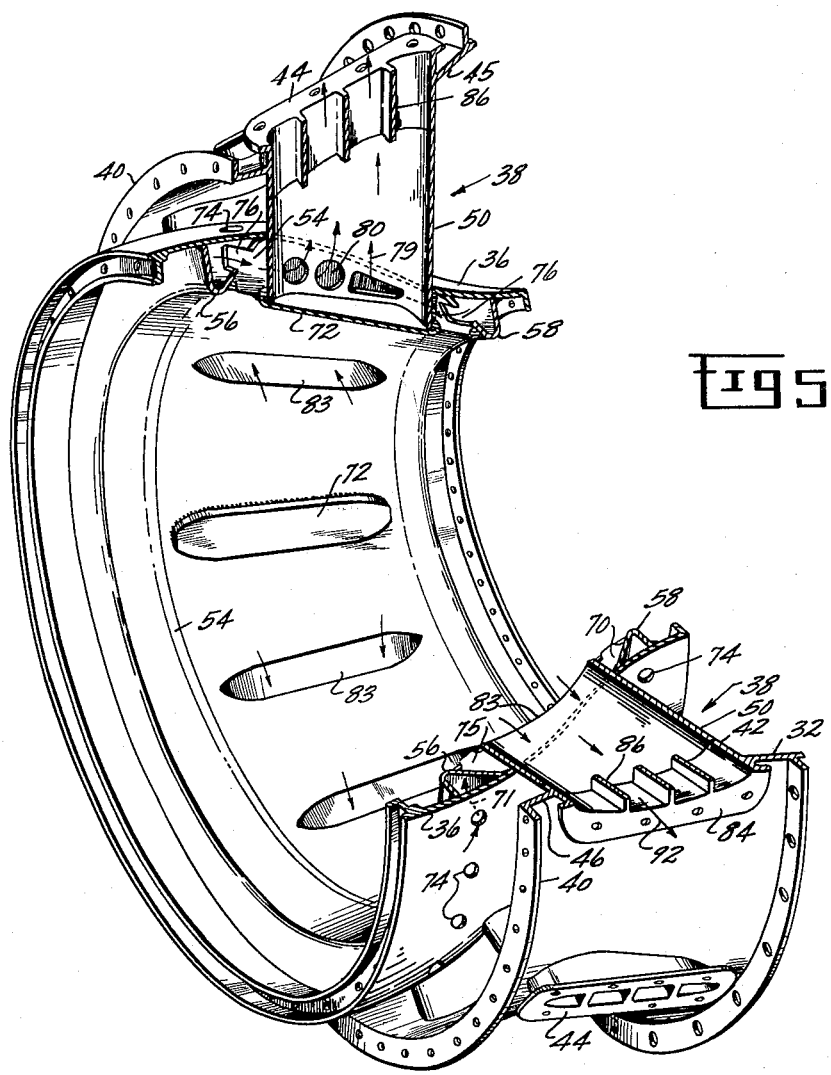
FIGURE 5 is a perspective view, partially in section, of the compressor rear frame.

Referring to FIGURE 1 a conventional gas turbine engine is shown provided with a compressor 10, combustor 12, and turbine 14 provided with a nozzle diaphragm 16. Further, as provided for in conventional gas turbine engines, a turbine rotor 18 is shown drivingly connected to the compressor rotor 20 through a shaft 22. Since the turbine 14 takes a sufficient amount of energy out of the gas stream to drive the compressor 10, it is rotating with respect to various portions that are stationary in the gas turbine engine. For example, portions of the compressor section 10, combustion section 12, and the turbine section 14 are stationary. Therefore, the stationary portions support the rotor or main shaft 22. This is accomplished by providing an aft bearing 24 at the nozzle diaphragm 16, a mid bearing 26 at the rear of the compressor, and a forward bearing 28 at the forward end of the compressor. Since many different types of loads are transmitted from the rotor, a compressor casing main frame 30, a radially flexible thin sheet metal compressor casing rear frame 32, outer combustion casing 33 and a turbine casing frame 34 are provided as the load supporting members. The compressor casing rear frame 32 and a frusto-conical diffuser inner cone, or annular inner member 36 define a diffuser passage 37 through which air from the compressor passes and is diffused on its way to the combustion chamber or combustion section 12. For purposes of this invention, the diffuser passageway is intended to cover that portion of the engine where the kinetic energy is converted into pressure energy by slowing down the motive fluid coming from the compressor for entrance into the combustion system. It is generally conventional to support the shaft or rotor 22 by the mid bearing 26 from the diffuser inner cone 36.

In order to support the rotor or shaft 22 from the frusto-conical inner cone 36, and to provide, for purposes of this invention, a radially flexible outer casing, a plurality of strut assemblies 38 are provided. These strut assemblies may be 6 or 7 in number extending in a radial direction placed about and within the diffuser passageway 37 as the design may require. The strut assemblies 38 are connected to the rear frame compressor casing 32 which is in turn connected to the compressor main frame casing 30 and combustor casing 33 through rigid flanges 40 and 41 generally by bolts. The strut assembly 38 includes a strut body portion 42 which is formed of two parts 44 and 50, hereinafter fully described, although it may be formed of one or more parts. In order to connect the strut assemblies to the outer casing at a point far enough away from the flange 39 on the main compressor casing 30 and the flange 40 on the compressor casing rear frame 32 so as not to be influenced by the radial rigidity of those flanges, the strut assemblies 38 are slanted rearwardly as best shown in FIGURE 1. The outer casing 32 is thereby provided with a portion between the rigid heavy casing flange 40 and the connection between the strut and the casing which is radially flexible. It will be understood that the purpose of this arrangement is to alleviate the mass effect and thermal gradient problems at the point of connection which are commonly present in the prior art designs. Thus, the required flexibility in the design, which is necessary for gradual dissipation of thermal stresses caused by the transfer of loads in hot sheet metal components by means of struts, is achieved by the placement of the strut-to-casing connection described herein. The strut body portion 42 includes an upper strut casting 44 which has a flange 45 extending into the plane of the thin outer casing 32. The flange 45 is butt welded to the outer casing 32 as shown at 46, at a point away from where the vertical portion of the strut and the flange 45 join to avoid the use of fillet welds at this juncture. Fillet welds are not only difficult to inspect, but are also weak in bending. Accordingly, the strut is designed to avoid the use of fillet welds by the use of the flange 45 and butt weld 46. The upper strut casting is also butt welded at 48 to the lower strut part 50 for the same reason. Although the upper strut is a casting, it is recognized and understood that it is within the scope of this invention to be fabricated sheet metal.

In order to make the rigid connection between the strut and the diffuser inner cone so that the strut and inner cone move in unison as a rigid body with substantially no relative flexibility between them, a box section 52 is provided. This box section is formed by the inner cone 36 and an inverted U-shaped channel section 54. The U-shaped channel section 54 extends between a forward bleed manifold 56 and a rear bleed manifold 58. Provision is made for rigidly securing the inner end of the strut part 50 with the inner cone by the strut extending through an opening in the inner cone 60 and an opening 62 in the channel 54. A fillet weld 64 is provided to secure the strut to the inner cone 36 and a fillet weld 66 is provided to secure the strut to the channel 54. To prevent relative rotation between the strut 42 and the box section 52, radial gusset plates 68 and 70 are provided at each axial end of the strut part 50 and manifold 56 and 58. The plates are welded on all four sides to the inner cone 36, strut part 50, manifold 56 and 58 and channel 54. The carrying of the torsional strut loading through the channel is accomplished by reinforcing it with transverse gussets 73 located between the legs of adjacent channels and welded to the legs and to the inner cone. In order to bleed air from the compressor for use as cabin or other air frame necessities without external complicating manifolding, and to provide uncontaminated air for the cabin, a means for bleeding air aft of the last stage of the compressor is provided.

There are two types of struts 38. One type has a closing cap 72 as best seen in FIGURE 2, for the bleeding of air from the diffuser passageway 37 as shown by the arrow 71 passing through the opening 74 in the inner diffuser cone 36. The air then passes through the manifolds 56 and 58 as shown by the arrow 75 passing inwardly through the passageway 76 in the manifolds. The bleed passageway is then formed by the channel 54 and strut part 50 as shown at 78 (FIGURE 3). The air is shown passing into the strut part 50 by the arrow 79 extending through openings 80 in the walls thereof.

The other type of strut 42 has an inlet opening 83 as shown in FIGURE 1 at the radially innermost end, for the passage of leakage air from the seal 82 to the atmosphere. As noted previously, there is a large pressure drop of the leakage air after it has passed thorugh the seal. Since this air is required to be maintained under relatively low pressure and is not suitable for other uses, it is discharged to the atmosphere through outlet opening 84. If retained in the vicinity of the seal and last stage of the compressor, it would result in an unbalanced axial force on the rotor. Also, in order to effectively discharge the low pressure leakage air to the atmosphere, the struts are required to provide a maximum cross sectional area. In prior engine designs, the cross sectional area required at least four struts to discharge this leakage air. The large number of leakage air struts as compared to bleed air struts placed a limitation on the amount of possible bleed air. This was due to the restriction to flow or pressure drop of the motive fluid in the main gas stream that would occur with the addition of more bleed air struts. However, with this design, more cross sectional area of each of the struts is provided for discharging leakage air to the atmosphere. This requires a lesser number of struts for discharging leakage air, and makes available more bleed air struts for cabin use, boundary layer control and other numerous uses.

Since the outer casing is a load carrying member, the partitions 86 are used to bridge the openings 84 to carry the loads across them without setting up high stress concentration areas around the openings.

As a result of the action of the hot gases on nozzle diaphragm 16, a torsional load shown at 88 is transmitted to the inner diffuser cone 36. Also, axial loads 90 are transmitted to the inner diffuser cone 36 due to the expansion of the hot gases through the nozzle diaphragm 16. The internal bursting loads are shown at 92 on the outer casing 32.

Under normal operation of a gas turbine engine, the turbine rotor shaft 22 and compressor rotor 20 all rotate at high speeds and therefore transmit various types of loads to the stationary portions of the engine. These loads are bearing radial loads as a result of maneuvering forces, thrust or axial loads from an unbalance of the rotor and stator system, torsional loads and axial loads on the inner cone due to gas loading of the first stage nozzle diaphragm, buckling pressure on the inner cone due to external pressure differential between the gas pressure in the diffuser passageway 37 and the pressure inside of the inner cone 36; internal bursting loads (hoop stress) on the outer casing. The bearing radial loads, torsional loads 88 and the axial gas loading 90 on the inner cone are effectively transferred out to the outer casing with a minimum amount of deflection of the bearing relative to the outer casing. The outer compressor casing rear frame 32 will transfer the internal loading on the outer casing to the flanges at 40 and 41 and also simultaneously resist the internal bursting loads. The transfer of these loads satisfactorily without failures is accomplished by rigidly fixing the inner end of the strut 50 in the box section 52 so that this end is rigidly attached to the inner cone. No deflection of the inner end of the strut with relation to the inner cone can take place. Further, relatively speaking, the outer end of the strut or upper strut casting 44 being butt welded to the thin outer casing as shown at 46 and the radially flexible outer casing 32 permits radial deflection of the outer casing as a result of differential thermal expansion between the inner cone struts and thin outer casing.

The struts are connected to the outer casing at a point sufficiently distant from the flanges 40 and 41 on the outer casing so as not to be influenced by their rigidity. Also, this construction does not require fillet welds at critical high stress concentration areas and in place uses butt welds that can be inspected more readily.

Also, maximum amounts of bleed air and maximum leakage air from the last stage of the compressor is provided for in this construction to meet the requirements of cabin air and discharge to the atmosphere.

While a particular embodiment of the invention has been illustrated and described, it will be obvious to those skilled in the art that various changes and modifications may be made without departing from the invention, and, it is intended to cover in the appended claims all such changes and modifications that come within the true spirit and scope of the invention.

What I claim as new and desire to secure by Letters Patent of the United States is:

1. In a gas turbine engine having a thin main load carrying outer casing having rigid annular flanges, means for supporting a rotor within said outer casing, said means including: an annular inner member forming with the outer casing a gas diffusing passage; at least one rearwardly-slanting, load transmitting strut of elongated streamlined cross section between the outer casing and the annular inner member, the strut presenting a minimum blockage area in the gas passage; manifolds extending about the inner portion of the annular inner member; channel means extending between and connecting said manifolds, said channel means and said annular inner member having spaced openings therein for receiving the inner end of said strut, the strut being rigidly attached at its inner end to the inner annular member so as to move in unison as a body with said member, and the outer end of the strut protruding through the outer casing; air passageways in the annular inner member, manifolds, channel means and strut providing means for bleeding air from within the gas diffusing passage through the strut and outside the outer casing; a flange around the full periphery of said strut below the outer end thereof for securing said strut to said outer casing, the connection between the peripheral strut flange and the casing being spaced remote from the rigid casing flanges by a section of the casing, the remotely spaced connection allowing the thin outer casing to be flexible adjacent the strut so as to be substantially unrestrained in radial deflection with respect to the rigid casing flanges.

2. In a gas turbine engine having a main load carrying casing including rigid annular flanges, means for supporting a rotor within said outer casing, said means comprising: an annular inner member defining a gas passage with the outer casing; a load transmitting, rearwardly-slanting strut of elongated streamlined cross section between the inner member and said casing; manifolds extending about the inner portion of the annular inner member; channel means extending between and connecting said manifolds, said channel means and said annular inner member having spaced openings therein for receiving the inner end of said strut, a box section provided on the inside of said inner member, the inner end of said strut being rigidly attached to said box section so that there may be movement without interacting deflection between said strut and inner member, the strut outer end protruding substantially beyond the outer casing; air passageways in the strut in communication with said manifolds and said channel means to bleed air from said gas passage; a flange around the full periphery of said strut for securing the strut to said outer casing, the connection between the strut flange and the casing being spaced from the rigid casing flanges by a section of casing which is substantially unrestrained in radial deflection with respect to said rigid casing flanges.

3. In a gas turbine engine having a main load carrying outer casing including rigid flanges, means for supporting a rotor within said casing, said means comprising: an annular inner member forming a gas passage with the outer casing; at least one rearwardly-slanting, load transmitting strut between the outer casing and the inner member, the outer end of said strut protruding beyond the outer casing; a box section formed in the inner member, said strut being rigidly attached to the box section at its inner end, and being secured around its full periphery and slightly radially inward of its said outer end to the outer casing at a point remote from said rigid casing flanges; a radially flexible section of the outer casing separating the peripheral strut flange to casing connection from said rigid casing flanges so as to permit relative radial deflection between said casing and said flanges; and air passage means extending from said gas passage into said box section and through the interior of said strut to the exterior of said outer casing.

4. In a gas turbine engine having a main load carrying outer casing including a rigid flange, means for supporting a rotor within said outer casing, said means comprising: an annular inner member defining with said outer casing a gas passage; at least one load transmitting strut between said outer casing and said inner member, the outer end of said strut protruding through said outer casing, the strut being hollow and having air passageways therein in communication with the interior of said inner member; a box section formed in the inner annular member, said box section having spaced upper and lower wall sections, the strut being rigidly connected to said spaced sections so as to move as a complete body with said inner annular member without deflection therebetween; a peripheral flange formed adjacent the outer end of said strut, said flange extending in the same plane as said outer casing and being connected thereto; and a section of a casing interposed between the peripheral strut flange-to-casing connection and the rigid casing flange, said section permitting deflection between the casing and the rigid flange whereby the load transmitted from the rotor to the inner member is transmitted to the outer casing without stress due to differential thermal expansion.

5. In a gas turbine engine having an outer main load carrying casing, means for supporting a rotor from said outer casing, said means including: an annular inner member defining a gas passage with said outer casing; at least one hollow load transmitting strut supporting the inner member on said outer casing, said strut protruding substantially beyond the outer casing; an inverted channel member attached to the inside of said inner member, said channel member having spaced outer and inner walls and side walls forming a box section, said strut piercing said spaced inner and outer walls and being rigidly connected thereto; a plurality of manifolds positioned on the inner side of said annular inner member; a plurality of openings in the inner member communicating with said manifolds and providing bleed air from said gas passage; and passageways in said manifolds and said strut in communication with each other and with said openings for directing a portion of the air from said gas passage into said strut to provide bleed air to the outside of the outer casing.

References Cited in the file of this patent

UNITED STATES PATENTS

| | | |
|---|---|---|
| 1,900,128 | Persons | Mar. 7, 1933 |
| 2,516,819 | Whittle | July 25, 1950 |
| 2,620,157 | Morley | Dec. 2, 1952 |
| 2,670,600 | Owner | Mar. 2, 1954 |
| 2,674,845 | Pouchot | Apr. 13, 1954 |
| 2,711,072 | Wetzler | June 21, 1955 |
| 2,930,662 | Henstridge | Mar. 29, 1960 |
| 2,961,150 | Pirtle | Nov. 22, 1960 |

FOREIGN PATENTS

| | | |
|---|---|---|
| 620,446 | Great Britain | Mar. 24, 1949 |
| 695,482 | Great Britain | Aug. 12, 1953 |